US007506302B2

(12) United States Patent
Bahrami

(10) Patent No.: US 7,506,302 B2
(45) Date of Patent: Mar. 17, 2009

(54) SYSTEM AND METHODS FOR BUSINESS PROCESS MODELING

(75) Inventor: Ali Bahrami, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 552 days.

(21) Appl. No.: 10/277,455

(22) Filed: Oct. 22, 2002

(65) Prior Publication Data

US 2004/0078777 A1 Apr. 22, 2004

(51) Int. Cl.
*G06F 9/44* (2006.01)
(52) U.S. Cl. .................................................. 717/100
(58) Field of Classification Search ................ 703/3, 703/6; 705/7; 717/104, 100–102
See application file for complete search history.

(56) References Cited

U.S. PATENT DOCUMENTS

| 6,038,393 | A | * | 3/2000 | Iyengar et al. ............... 395/701 |
|-----------|---|---|--------|----------------------------------------|
| 6,216,098 | B1 | * | 4/2001 | Clancey et al. ................. 703/6 |
| 6,886,007 | B2 | * | 4/2005 | Leymann ........................ 703/3 |
| 7,117,214 | B2 | * | 10/2006 | Wiser et al. ................... 707/10 |
| 7,146,350 | B2 | * | 12/2006 | Holland et al. ................ 706/47 |
| 7,350,184 | B2 | * | 3/2008 | Upton ......................... 717/100 |
| 2001/0011366 | A1 | * | 8/2001 | Beck et al. ..................... 717/1 |
| 2002/0188597 | A1 | * | 12/2002 | Kern et al. ..................... 705/7 |
| 2004/0034857 | A1 | * | 2/2004 | Mangino et al. ............. 718/104 |
| 2004/0060037 | A1 | * | 3/2004 | Damm et al. ................ 717/105 |

OTHER PUBLICATIONS

George Chin Jr., et al. "New Paradigms in Problem Solving Environments for Scientific Computing", Jan. 2002, ACM, pp. 1-8.*
Gillmann et al. "Workflow Management with Service Quality Guarantees", Jun. 2002, ACM, pp. 228-239.*
Eshuis et al., "Verification support for workflow design with UML activity graphs", May 2002, ACM, pp. 166-176.*
Bahrami, A. et al., *Enterprise Architecture For Business Process Simulation*, Winter Simulation Proceeding (Washington, DC, Dec. 13-16, 1998), 2:1409-1413.
Butler, K., *UML Requirements for Designing Usable and Useful Applications: Position Paper for the 2nd SIGCHI Workshop on OO Modeling for UI Design*, 1-23 http://www.primaryview.org/CHI98/PositionPapers/KeithB.htm.

* cited by examiner

*Primary Examiner*—Wei Y Zhen
*Assistant Examiner*—Anna Deng
(74) *Attorney, Agent, or Firm*—Harness, Dickey & Pierce, P.L.C.

(57) ABSTRACT

A method for providing closed-loop analysis of a business process includes using modeling objects to extend a modeling language to obtain a representation language. The representation language is used to obtain at least one model of the process. The model is implemented using at least one of simulation, project management analysis, workflow analysis and computer-aided software engineering. The method allows a variety of COTS products to be integrated into a single tool for process modeling and closed-loop analysis of business processes.

20 Claims, 9 Drawing Sheets

SYSTEM AND METHODS FOR BUSINESS PROCESS MODELING

FIELD OF THE INVENTION

The present invention relates generally to process modeling and, more particularly, to modeling and closed-loop analysis of business processes.

BACKGROUND OF THE INVENTION

Businesses have sought to utilize data processing systems and information networks, not only to automate their operations, but also to reshape and improve their business processes. The tendency for many businesses, however, has been to try to extend the application of existing but limited-purpose data bases and architectures beyond the scope of their intended uses, rather than to approach business information processing needs with an overall strategy. Business process reengineering and object oriented initiatives have contributed to evolution of such process modeling techniques as the use of workflow models, modeling languages, data modeling and object modeling.

Nevertheless, business process modeling and analysis via simulation still present challenges to enterprises seeking to improve process evaluation and implementation. For example, processes can be poorly defined and documented, and data and metrics relating to processes may be lacking. Such information can be difficult to find, and process descriptions may have become absolute and unreliable by the time they are published.

It is common for a variety of commercial off-the-shelf software (COTS) products to be used within a single business enterprise for performing different aspects of process modeling. Lack of compatibility among such products, however, can make it difficult or impossible to integrate their use to provide comprehensive and up-to-date information. Techniques are known for integrating various COTS products, but such techniques have limitations. For example, code can be embedded within a particular project management product that allows it to work in coordination with a particular workflow product. Such code, however, is specific to both products and allows only those two products to work together. Such an approach has only limited use in an enterprise that utilizes many different project management products, workflow products and other process modeling tools such as simulation engines.

SUMMARY OF THE INVENTION

The present invention, in one preferred embodiment, is directed to a method for providing closed-loop analysis of a business process. The method includes using at least one modeling object to extend a modeling language to obtain a representation language. The representation language is used to obtain at least one model of the process. The model is implemented using at least one of simulation, project management analysis, workflow analysis and computer-aided software engineering.

The above method allows a variety of COTS products to be integrated into a single tool for process modeling and closed-loop analysis of business processes. Such a tool can be accessible throughout an enterprise to facilitate process improvement efforts. The above method facilitates process modeling and allows the use of a static model in a dynamic simulation to test ways of improving a process.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
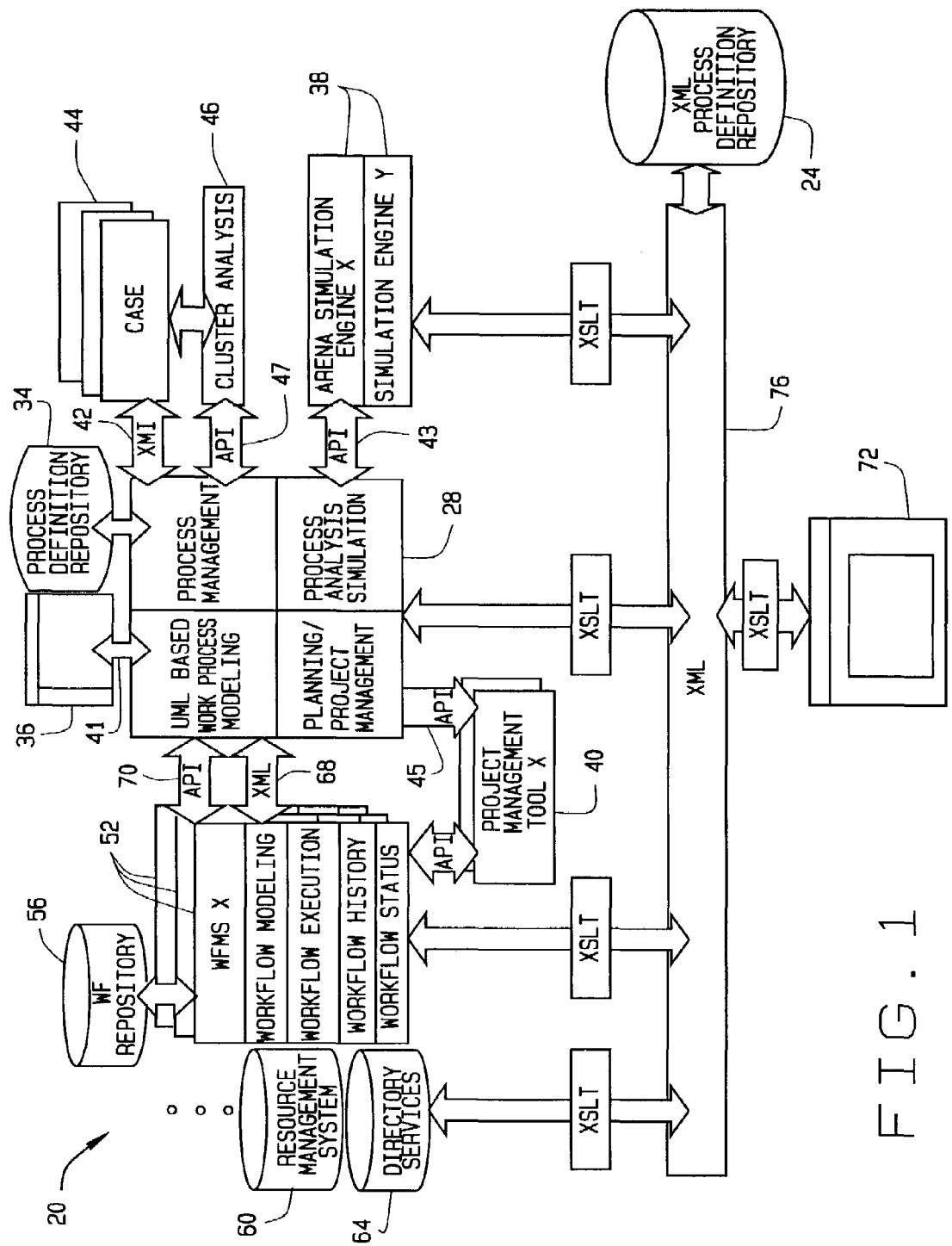
FIG. 1 is a diagram of a system for modeling business processes according to one embodiment of the present invention.

A system for modeling business processes is indicated generally by reference number 20 in FIG. 1. The system 20 can be implemented, for example, using computers connected in an enterprise network. The system 20 can be used to document work processes, model and simulate such processes, and exchange models with workflows for execution of work processes. It should be noted generally that the system 20 can incorporate a plurality of commercial off-the-shelf software (COTS) tools by utilizing open architectures of such components, as shall be described in greater detail below.

The system 20 includes a repository 24, for example, a Microsoft® Access™ data base, Microsoft® SQL Server™ or other suitable data base. The repository 24 is used for storing data and metadata such as business process models, simulations, and statistical analysis results relative to processes. Information stored in the repository 24 includes, but is not limited to, activity diagrams, use case diagrams, class diagrams, roles, and sequences in HTML (Hypertext Markup Language), XML (Extendible Markup Language) and XMI® (Extendible Markup Language Metadata Exchange, from Object Management Group, Inc., of Needham, Mass.). The repository 24 also can hold process metrics and process documentation. Storing models in the repository 24 makes it possible to perform searches and queries on processes and to make them available, for example, on an enterprise-wide basis as further described below.

The system 20 also includes a process management subsystem 28 that utilizes a repository 34 for storing data and metadata as further described below. The process management subsystem 28 also communicates with a flowcharting tool 36 such as Microsoft Visio®, and at least one simulator 38, for example, Arena® Business Edition™ by Rockwell Software, Inc. of West Allis, Wis. The process management subsystem 28 also interfaces with a project management tool 40, for example, Microsoft® Project or a project management package from Primavera Systems, Inc., of Bala Cynwyd, Pennsylvania. It should be noted that other numbers and types of COTS flowcharting tools, simulators and project management tools could be used, for example, in various departments of an enterprise utilizing the system 20. The process management subsystem 28 interfaces with the flowcharting tool(s) 36, simulator(s) 38 and project management tool(s) 40 via application programming interfaces (APIs) 41, 43 and 45.

The process management subsystem 28 also interfaces, via an XMI interface 42, with computer-aided software engineering (CASE) tools 44. The CASE tools 44 interface with a cluster analysis tool 46 accessible by the process management subsystem 28 via an application programming interface (API) 47. The tool 46 is, for example, "ClusterVis" by Chris Esposito, The Boeing Company, Chicago, Ill., or could alternatively comprise another tool useful for performing cluster analysis of data elements, as known in the art.

At least one workflow management subsystem or tool 52 utilizes a workflow data base 56. The workflow management tool(s) 52 are COTS tool(s), for example, TIBCO InConcert™ by TIBCO Software Inc., of Palo Alto, Calif. It should be noted that other numbers and types of workflow management products could be used. In embodiments including more than one workflow management tool 52, the tools 52 can be of different types and from different manufacturers. The system 20 also includes a resource management system 60 and a directory services data base 64. The data base 64 includes resources that can be used to populate models, e.g. in the repository 34, for simulation as further described below. Resources from the data base 64 can also be augmented with information such as roles and can be used for generation of workflow as further described below.

The process management subsystem 28 communicates with the workflow management subsystem 52 via an interface 68. The interface 68 is workflow-neutral. That is, the interface 68 is configured so as to allow the process management subsystem 28 to be integrated with any workflow management system. The interface 68 is written in, for example, Workflow Extendible Markup Language (Wf-XML) from the Workflow Management Coalition, at http://www.wfmc.org. The process management subsystem 28 also communicates with the workflow management subsystem 52 via an application programming interface (API) 70.

The CASE tools 44, process management subsystem 28, workflow management subsystem 52 and other systems such as the resource management system 60 interface with the repository 24 and at least one web portal 72 via an XML and XML Style-sheet Language Transformation (XSLT) import/export interface 76. Thus modeling can be performed, and process information such as process flowcharts, metrics and documentation can be published and viewed, via an intranet and/or the Internet.

Operation of the system 20 in one embodiment shall now be described. Modeling via the system 20 generally is based on extensions of diagrams in a suitable modeling language, e.g., Unified Modeling Language (UML™), a modeling language by Object Management Group, Inc. of Needham, Mass. The diagrams, further described below, are extended by modeling objects so as to be independent of vendors' proprietary tools and protocols. Metadata such as the diagrams can be captured in reusable process components that facilitate creation of business process vocabularies, as further described below. The diagrams define a static view of a business process that, for example, with additional information relating to resources and duration of tasks, can be used directly in dynamic simulation of the process.

It should be noted generally that, although the present embodiment is described in connection with UML™ and Wf-XML, other languages could be used. Processes are represented using at least three diagram types: (1) class diagrams for data modeling and for modeling objects defined within processes; (2) use-case diagrams for expressing how actors (e.g. people and/or departments) and systems interact to accomplish a portion of a business (or system); and (3) activity diagrams for modeling workflows, business process definitions, simulation, and workflow execution. It should be particularly noted that by using one or more modeling object(s) to extend one or more diagram(s) as described herein, one or more representation language(s), i.e. modeling language(s), can be developed.

Figure 2:
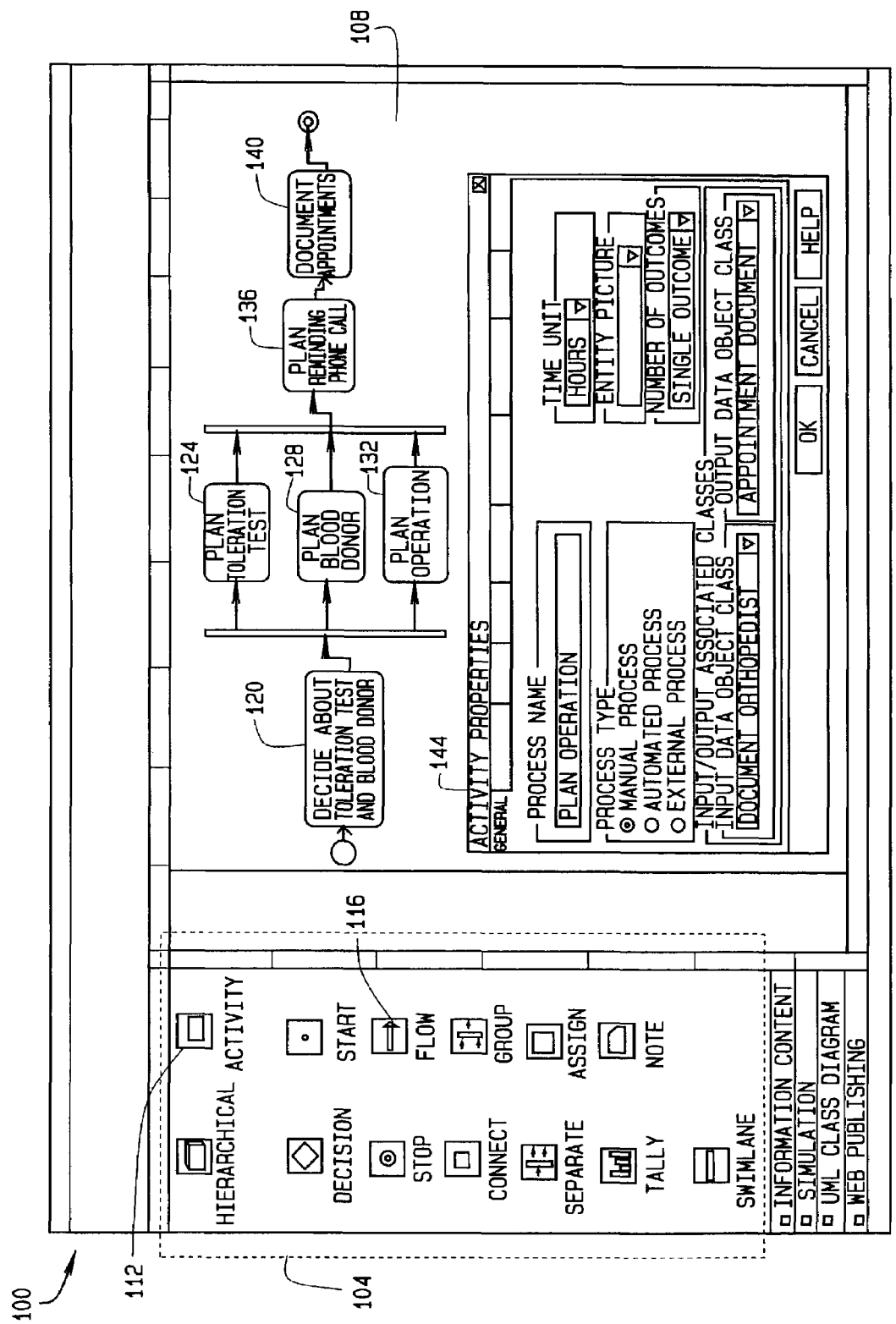
FIG. 2 is an illustration of a business process activity diagram for "Planning of an Operation"

A user can perform modeling via the portal 72 in the following exemplary manner. An existing model in repository 24 or 34 can be opened, or a new model can be generated. Types of models include business process models, class diagrams and use case diagrams. A business process activity diagram, e.g. for making a reservation for a medical operation, is indicated generally by reference number 100 in FIG. 2. Modeling objects for process modeling and simulation are provided, for example, via stencils 104 for use on a Visio™ software drawing sheet 108. To draw a process flowchart in an activity diagram format, a user places appropriate modeling objects, for example, an activity denoted by a stencil 112 and/or a flow object denoted by a stencil 116, on the drawing sheet 108.

The term "activity" includes a single activity or set of activities needed to accomplish a single goal. For example, the activity diagram 100 includes the following activities: "Decide About Toleration Test and Blood Donor" 120, "Plan Toleration Test" 124, "Plan Blood Donor" 128, "Plan Operation" 132, "Plan Reminding Phone Call" 136, and "Document Appointments" 140. An activity typically can be described by a plurality of properties, e.g. time needed to complete the activity, resources needed to accomplish the activity, input and/or output queue size, and cost information. These properties can be displayed and modified by the user, for example, via a window 144.

Each activity diagram (or process component, as described further below) can be related to a use-case diagram. A use case is a sequence of events, performed through a system that yields an observable result of value for a particular actor. Because use cases address observable results of value, use cases can serve as organizational structures for defining requirements for a process. It is assumed in a use case that a certain service provider or role is in charge of a service or task in question. It is also assumed that, based on the character of the service or task, some form of interaction occurs between the service provider or role and a client during accomplishment of the service or task in question.

Figure 3:
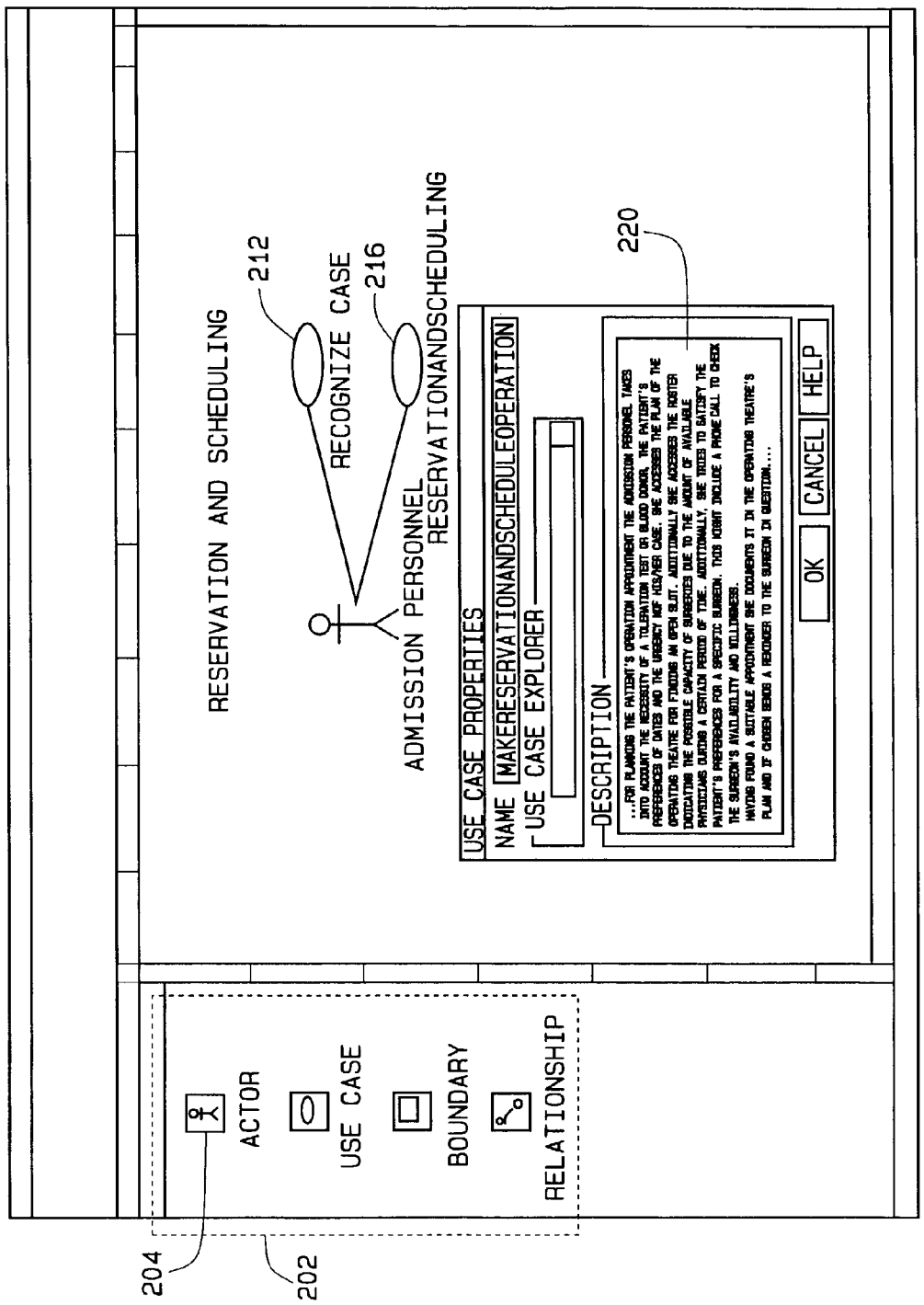
FIG. 3 is an illustration of a use case diagram for "Reservation and Scheduling"

A typical use case diagram frame for reservation and scheduling is indicated generally by reference number 200 in FIG. 3. The use case diagram 200 includes stencils 202 via which modeling objects are used. For example, a service provider or role is indicated by an actor object via a stencil 204. Two use case objects 208 are shown: "Recognize Case" 212 and "Reservation and Scheduling" 216. A use case can be described in a plurality of ways, for example, in a text description 220 included as a property in the use case diagram 200, and in a related activity diagram. A use case can also be described in a use case diagram (not shown) modeling cooperation aspects of a given process.

An activity diagram related to a given use case provides information about a process underlying the performance of the given use case. For example, referring to FIGS. 2 and 3, the activities 120, 124, 128, 132, 136, and 140 (or process components, as further described below) are accomplished through the "Reservation and Scheduling" Use Case 216. Details of an activity can be described using activity diagrams. For example, the Activity "Plan Operation" 132 could include activities such as accessing inner organizational shared information and contacting surgeons. Thus a plurality of levels of detail can be shown in activity diagrams where hierarchical process modeling is used. In hierarchical process modeling, a process is modeled on a plurality of levels of detail, such that lower levels or sub-processes are included in higher level processes.

Figure 4:
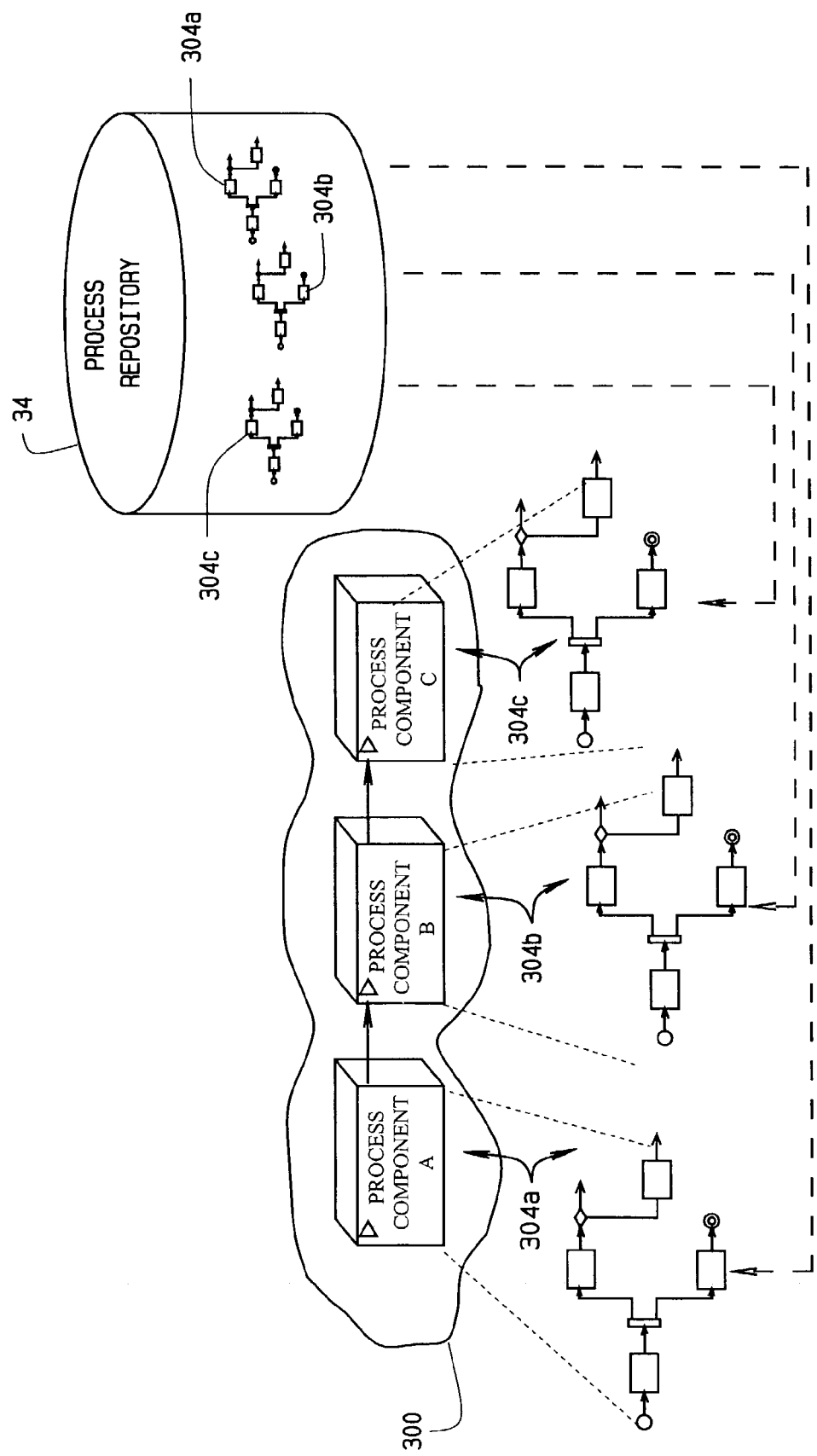
FIG. 4 is an illustration of a process model including process components.

Processes and sub-processes may be saved in the repository 34 as process components 304 for reuse in modeling and simulation. For example, as shown in FIG. 4, a process model 300 has a plurality of process components 304 which are stored in the repository 34 and used in a linked mode. Where a process component 304 is used in a model in a linked mode and the component 304 is subsequently modified in the repository 34, the system 20 updates all linked instances of the process component 304. Thus a user can define "vocabularies" of reusable models that can be referenced as process components by higher-level, less detailed models. If it is desired that a particular use of a process component not be automatically updated within a particular model, an instance of the component is embedded (instead of being linked) into the model.

Figure 5:
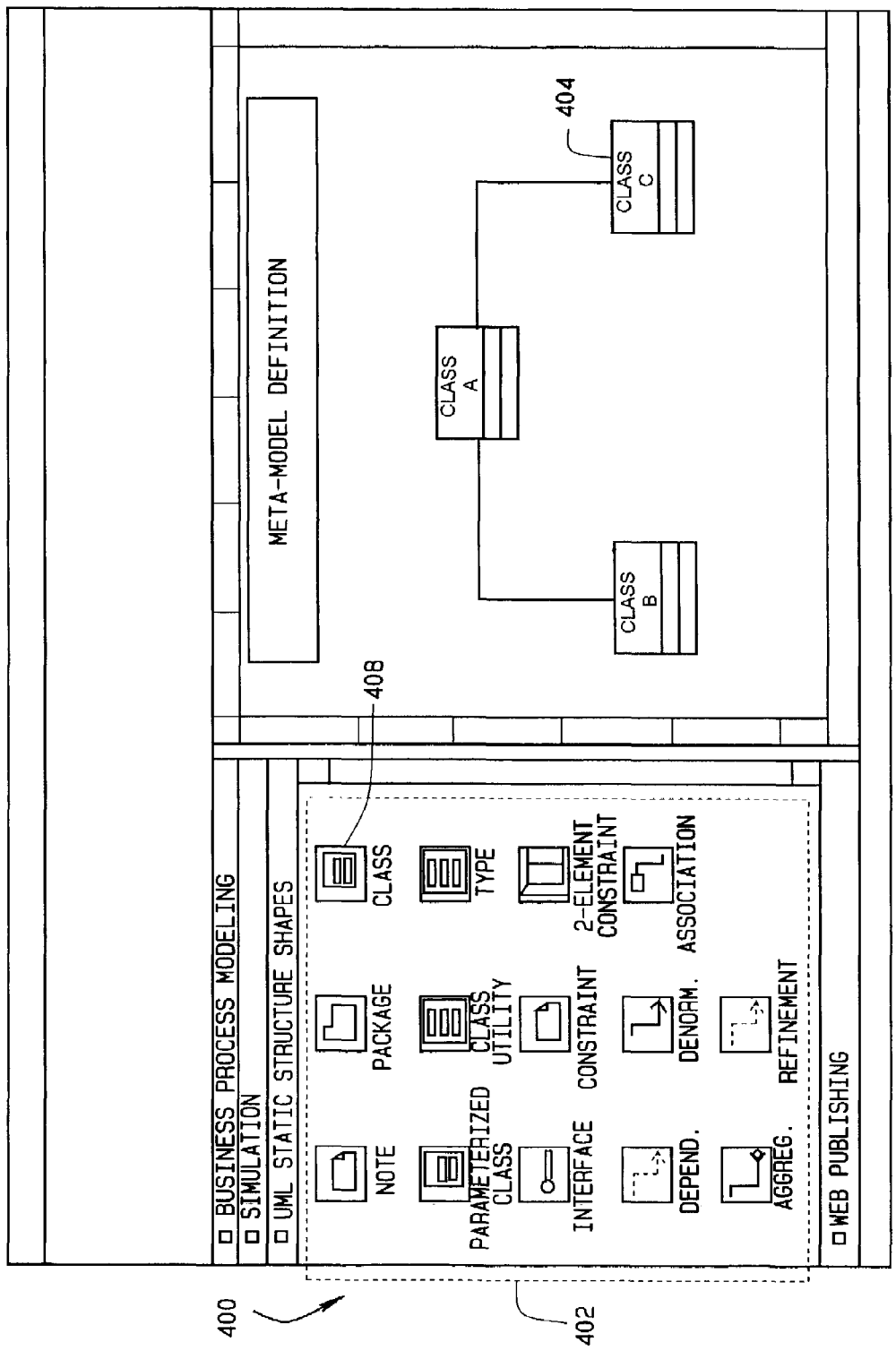
FIG. 5 is an illustration of a model composition frame in which a class diagram is utilized.

Models can be composed in various degrees of complexity by "meta-modeling", that is, by linking process components 304 from the repository 24. Composition of such models can be described using class diagrams. Class diagrams describe types of objects and various static relationships among them. A typical class diagram composition frame is indicated generally by reference number 400 in FIG. 5. The class diagram 400 includes stencils 402 describing objects for use in meta-modeling processes. For example, as shown in FIG. 5, three classes 404 are each represented by a class object stencil 408.

As can be seen from the foregoing description, a static model of a process can be defined using extended activity diagrams. In general, the system 20 can be used for process mapping, metrics collection and process simulation. In process mapping, work and system processes are defined by identifying each individual activity and its relationship to other activities. In other words, business processes are documented by depicting process steps and how material and information flows in an overall process. Causal relationships and logic flows are included in process mapping.

The level of detail in process mapping is arbitrary and depends on who is the user of the mapping. The finest, i.e. lowest, level of detail describes tasks of people who perform individual tasks, such as machinists and fabricators. A relatively coarse level of detail may be appropriate for a management level, for example, to enable a manager to have knowledge of sub-processes for which he or she may have responsibility. Thus a manager can have a grasp of details relevant to his or her duties without being burdened with minutiae. To capture different levels of detail in process mapping, hierarchical process modeling can be used as previously described.

Such a model can be used in a simulation to test ways of improving the modeled process. A simulation is a dynamic modeling of a process flow. Simulation facilitates creation of a real or proposed system for the purpose of evaluating system behavior under various conditions. Simulation is performed via the simulator 38 and generally allows a user to obtain quantitative information from a process model. For example, simulation can provide information as to cycle time, cost, required resources and resource allocation. When a process is desired to be simulated, a user augments an activity diagram representing the process (e.g. the diagram 100 shown in FIG. 2) with simulation modeling objects that enable the model to be simulated.

Figure 6:
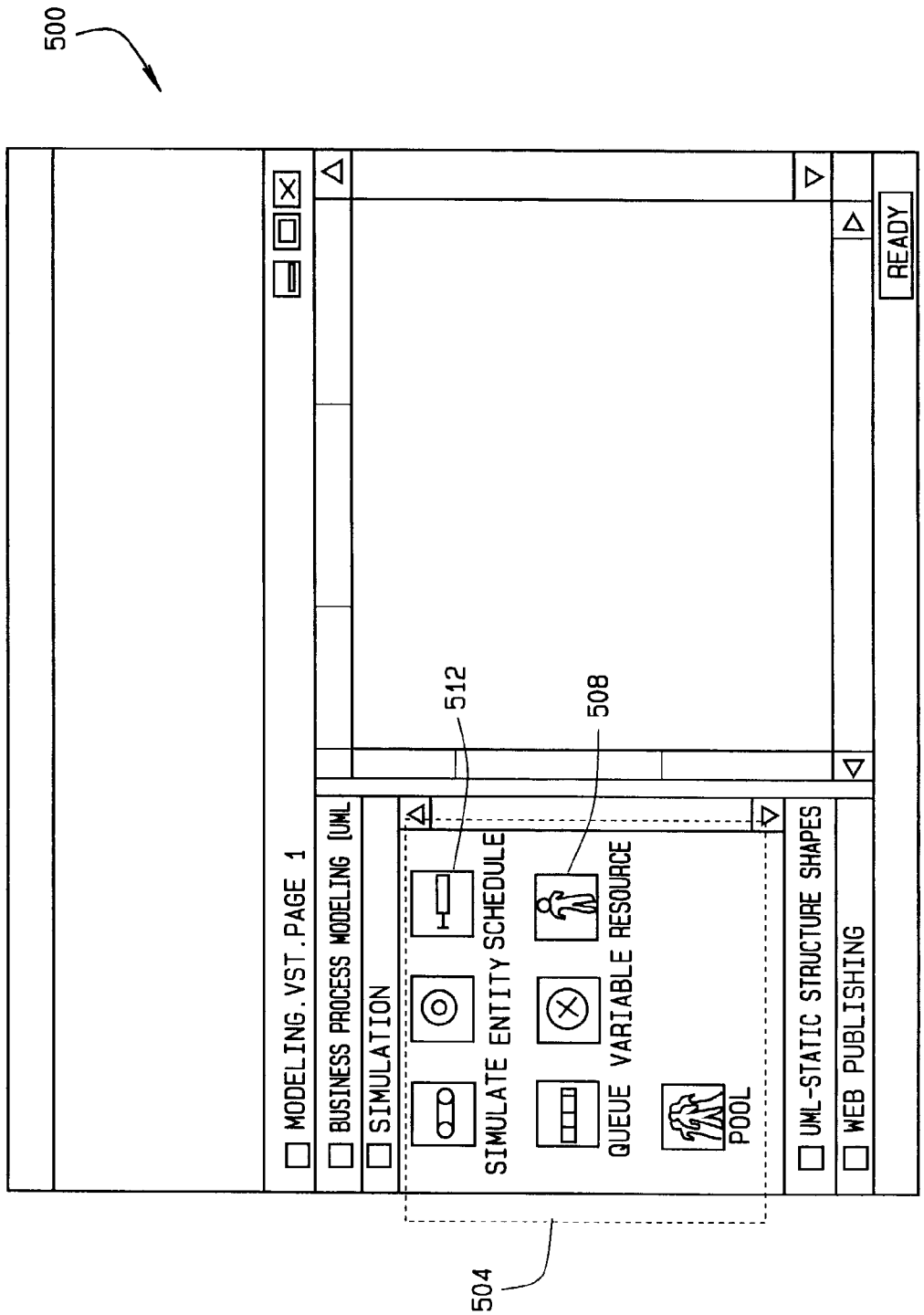
FIG. 6 is an illustration of a simulation frame.

More specifically, a simulation frame, indicated generally by reference number 500 in FIG. 6, is used to specify simulation properties. The frame 500 includes simulation stencils 504 that can be used to extend the activity diagram representing the process. Simulation modeling objects can be used, for example, via stencils 508 and 512 respectively to define resource selection and scheduling. Thus the process management subsystem 28 allows a user to select and augment a process model from the repository 24, simulate the model via the simulator 38, and update the repository 24 with the simulation results.

Figure 7:
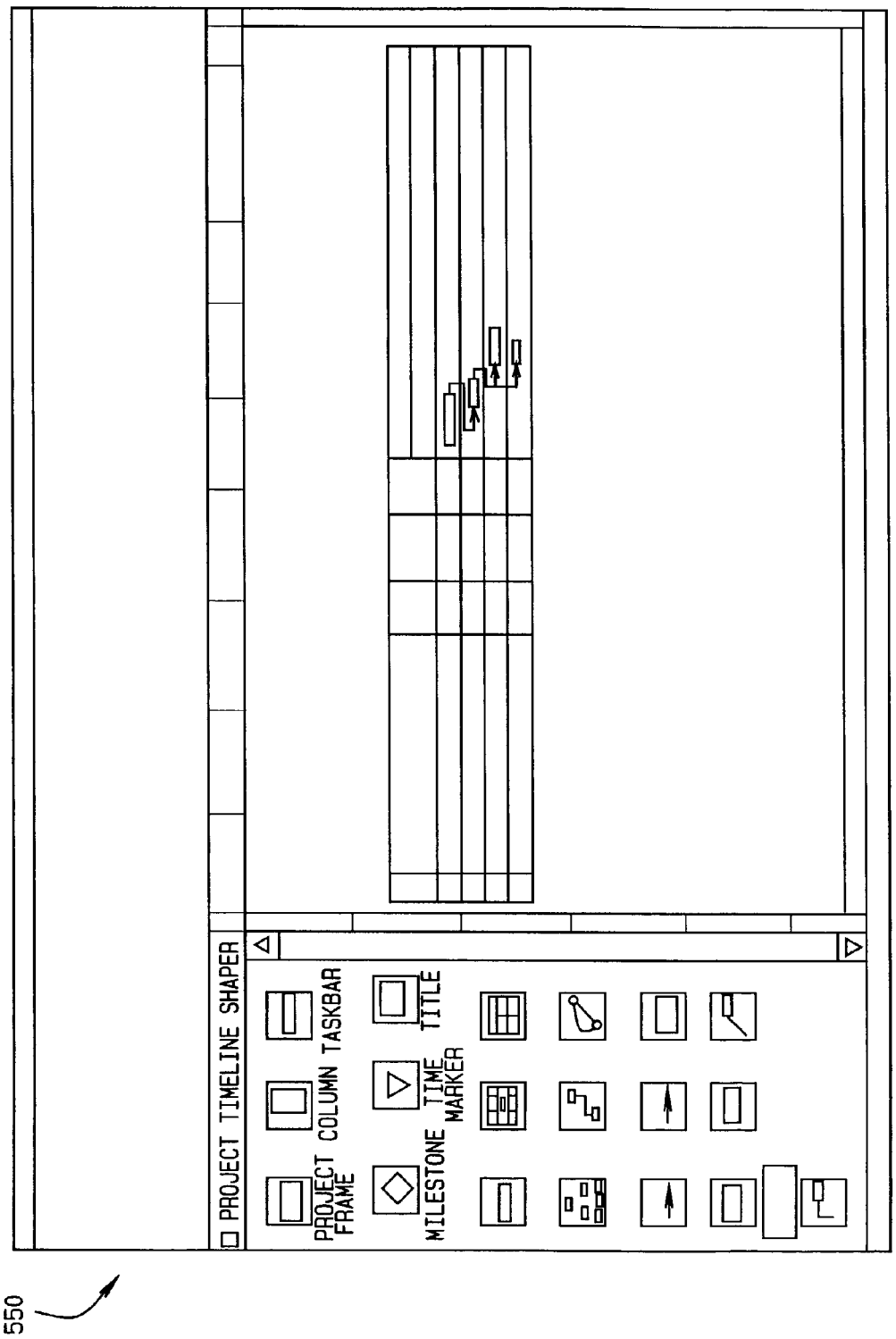
FIG. 7 is an illustration of a project management frame displaying a Gannt chart.

Models generated via the process management subsystem 28 also can be transferred to the project management tool 40. For example, based on simulation of a process as previously described, a process duration can be generated representing the process based on dynamic allocation of resources. The process duration is shown, for example, in a project management frame displaying a Gannt chart, as indicated generally by reference number 550 in FIG. 7. The process duration data can be sent to the project management tool 40 and/or web portal 72. The process management subsystem 28 also generates workflow models, as shall now be described.

The process management subsystem 28 includes code that maps semantics of the workflow tool 52 to the project management tool 40 and back. The subsystem 28 utilizes object models exposed by both the workflow tool 52 and the project management tool 40. An information model associated with the workflow tool 52 is extended to allow for semantic integration with the project management tool 40, independent of which COTS tools may be utilized as the tools 52 and/or 40. The subsystem 28 allows a workflow template for the workflow tool 52 to be generated from an existing project management tool 40 file, and a workflow model for the workflow tool 52 to be transferred from the workflow tool 52 to a model for the project management tool 40 and back to a workflow model for the workflow tool 52.

The foregoing steps can be performed without regard to which workflow and project management products are used in the system 20. The subsystem 28 provides abstractions of workflow and project management that can be used to model behaviors of whatever workflow and project management tools 52 and 40 may be in use. Thus the subsystem 28 provides a neutral representation of an semantically integrated model of workflow and project management for a process. This neutral representation is based upon a workflow information model internal to the workflow tool 52 and upon objects that extend the information model. It is to be noted that no code is implemented within the workflow tool 52 or project management tool 40 to implement this neutral representation. Thus a model of a process can be implemented using a product-independent definition of the process.

Extensions that can be made to the workflow information model via modeling objects to provide semantics for a representation of a workflow model integrated with a project management model of the same process include those shown in Table 1.

TABLE 1

Extensions to Workflow Information Model

| Base Entity | Extension | Description |
| --- | --- | --- |
| Job | Scheduled | Indicates if this workflow falls into a category of workflows that require resource management through the use of project management |
| | Default Time Units | Indicates the default time units for the project management representation |
| Task | Time Units | Indicates the project management time unit representation for this task - overrides a default |
| | Estimated Duration | Estimated calendar duration for task |
| | Estimated Start Date | Estimated Start date for the task |
| | Estimated End Date | Estimated end date of the task |
| | Estimated Work | Estimated time units required by assigned resource |
| | Estimated Work Remaining | Estimated time units required by assigned resource to complete |
| | Baseline Duration | Baseline duration to compare progress against. |
| | Baseline Start Date | Baseline start date to compare progress against. |
| | Baseline End Date | Baseline end date to compare progress against. |
| | Baseline Work | Baseline work units allocated to resource to complete work - used to compare progress |
| | Actual Duration | Actual number of calendar units required to complete the task |
| | Actual Start Date | Actual start date of task |
| | Actual End Date | Actual end date of task |
| | Actual Work | Actual time units required by resource to complete task |
| | Actual Work to Date | Actual time units consumed to reporting date by resource. |
| | Critical | Indicates that the project management system determined that this task is on the critical path |
| | Original Resource Pool | Resource pool originally identified for selection of specific resource to assign to task |

A workflow model can be transformed into a project management model, and back into a workflow model, in the following manner. A user:

a) creates a workflow within the workflow tool 52;
b) initiates the subsystem 28;
c) selects a workflow model from the subsystem 28;
d) selects a destination project management system (e.g. the tool 40); and
e) requests that the selected workflow model be transferred to the project management system 40.

The subsystem 28 then:

a) initiates the project management system 40;
b) reads the selected workflow model;
c) maps tasks of the workflow model into task semantics within the project management system 40;
d) maps inter-task dependencies defined in the workflow model to inter-task dependencies within the project management system 40;
e) maps workflow task resource pools to a task in the project management system 40;
f) maps resources contained in the workflow resource pools to resources within the project management system 40; and
g) makes the project management system 40 visible to the user and turns focus to the project management system 40.

The user then:

a) assigns physical resources to each task;
b) assigns start dates to tasks;
c) calculates a critical path;
d) does resource balancing;
e) repeats steps a through d until satisfied;
f) returns to the subsystem 28; and
g) requests that the model in the project management system 40 be transferred back to the workflow system 52.

The subsystem 28 then:

a) reads each task from the project management system 40;
b) populates extended attributes of each task with data taken from the project management system 40;
c) closes the project management system 40; and
d) waits for the user to close the subsystem 28.

The concept of loops with conditional branching is defined in workflow, but not in project management. Thus a user is allowed to define a number of estimated loops a workflow will generate to complete a process. The subsystem 28 then instances the set of tasks in the project management system 40 spanned by the loop the number of times indicated by the user. Thus a project manager can see an impact of resources being consumed by the repeated tasks. If actual execution of the workflow uses more or fewer iterations than specified, such impacts are shown in the project management system 40.

Also defined in workflow, but not in project management for project models, is the use of conditions on execution steps to determine the execution paths of a workflow. Thus a user is allowed to pick an initial path that is transferred to the project management system 40. The initial path is used as a baseline for a project. If different paths are picked by execution conditions of the workflow model, the paths are represented in the project management system 40. Thus a manager can assess the impacts of execution path changes.

Changeover from project management to workflow operates in the following manner. Because semantics are limited in a project management model, the structure of a workflow can be created, but with limited information from the project management model. Thus the subsystem 28 assumes that a project defined in the project management system 40 is to be used as a template for future workflow instances, and not as a current running workflow. The user:

a) starts the subsystem 28;
b) requests that the subsystem 28 display project models from the project management system 40;
c) selects a desired project management model; and
d) requests that the model be transferred to the workflow system 52.

The subsystem 28 then:

a) requests the user to provide a name for the workflow;
b) requests the user to define a base template class for the workflow;
c) reads the selected project;
d) maps the project tasks to workflow tasks;
e) maps the project inter-task dependencies to workflow inter-task dependencies; and
f) for each task, requests that the user identify the task owner and resource pool assigned to the task.

The system 20 also can be used to generate requirements and code for supporting software to implement models of business processes. For example, the system 28 can generate data for use by the cluster analysis tool 46, to perform cluster analysis and drive new classes based on their attribute clusters in such processes. The cluster analysis tool 46 interfaces with the CASE tools 44 to generate class diagrams. The cluster analysis tool 46 analyzes a model to identify candidate class definitions for export to the CASE tools 44. The CASE tools 44 generate requirements and code based on the class definitions.

The subsystem 28 can export and/or import use case models to and/or from the CASE tools 44. When a use case model is to be exported, the subsystem 28 can retrieve the use case model from the repository 34 and generate XMI that can be read by a CASE tool 44. When a use case model is to be imported from a CASE tool 44, the subsystem 28 reads XMI generated by the CASE tool 44 and generates a use case that can be saved in the repository 34.

Figure 8:
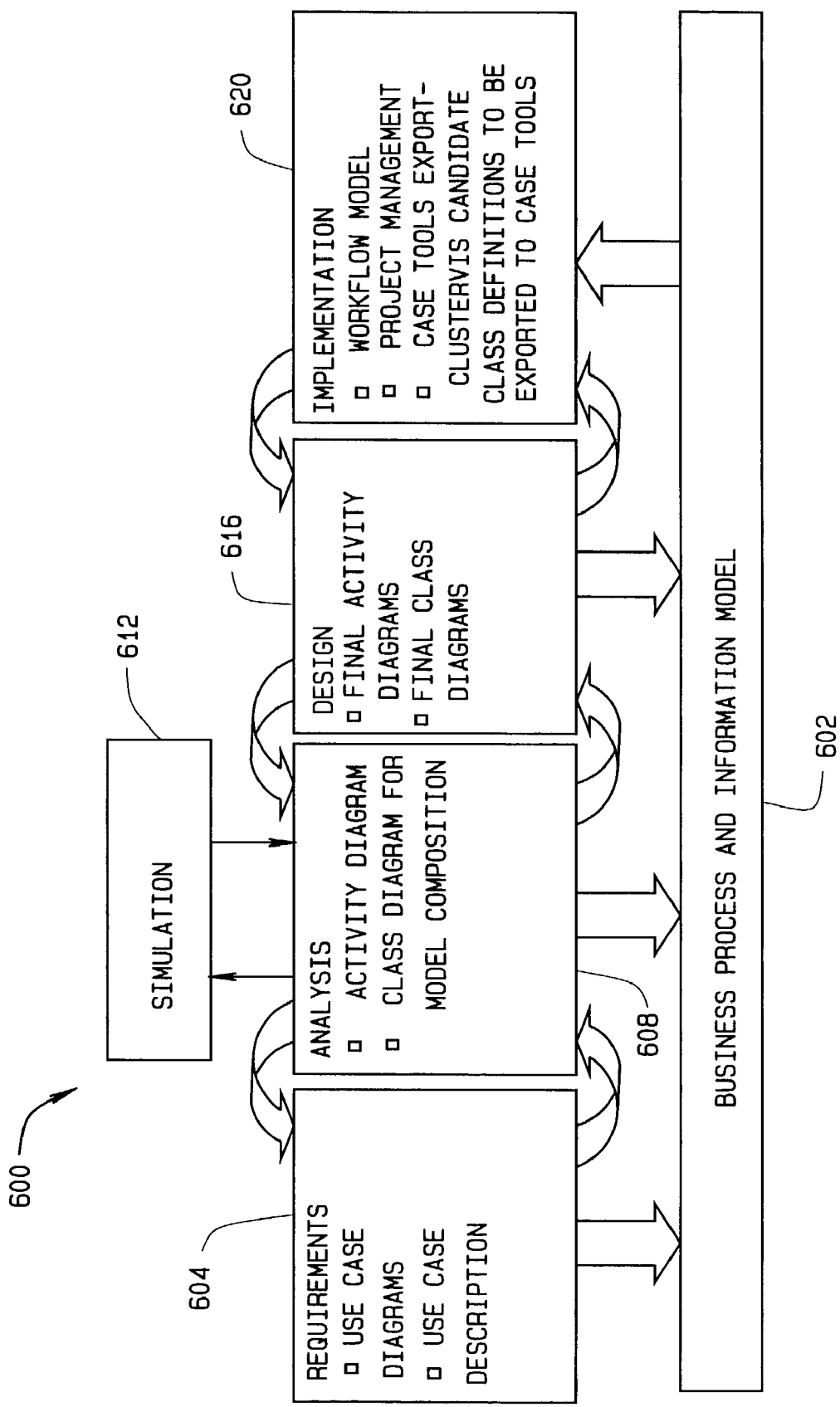
FIG. 8 is a diagram of interaction among system components in the system.

Interaction among system components of the system 20 is exemplified in a diagram indicated generally by reference number 600 in FIG. 8. The diagram 600 summarizes embodiments of methods described above for modeling business processes. More specifically and for example, to develop a model 602, modeling requirements can be captured at step 604 via use case diagrams and use case description. At step 608, modeling analysis can be performed using activity diagrams and class diagrams for model composition. Analysis also can include simulation at step 612. Modeling design can be performed at step 616 to improve and/or finalize activity diagrams and class diagrams.

Implementation of a model at step 620 can include workflow analysis using a workflow model, project management analysis using a project management model, and/or cluster analysis to produce candidate class definitions for export to CASE tools. Results derived at step 620 can be used, for example, at step 616 for modeling design. It can be seen that the subsystems 28 and 52, simulator 38, project management tool(s) 40 and CASE tools 44 can be used and reused in various orders to model, evaluate and/or implement a process and to perform closed-loop analysis on such a process.

Figure 9:
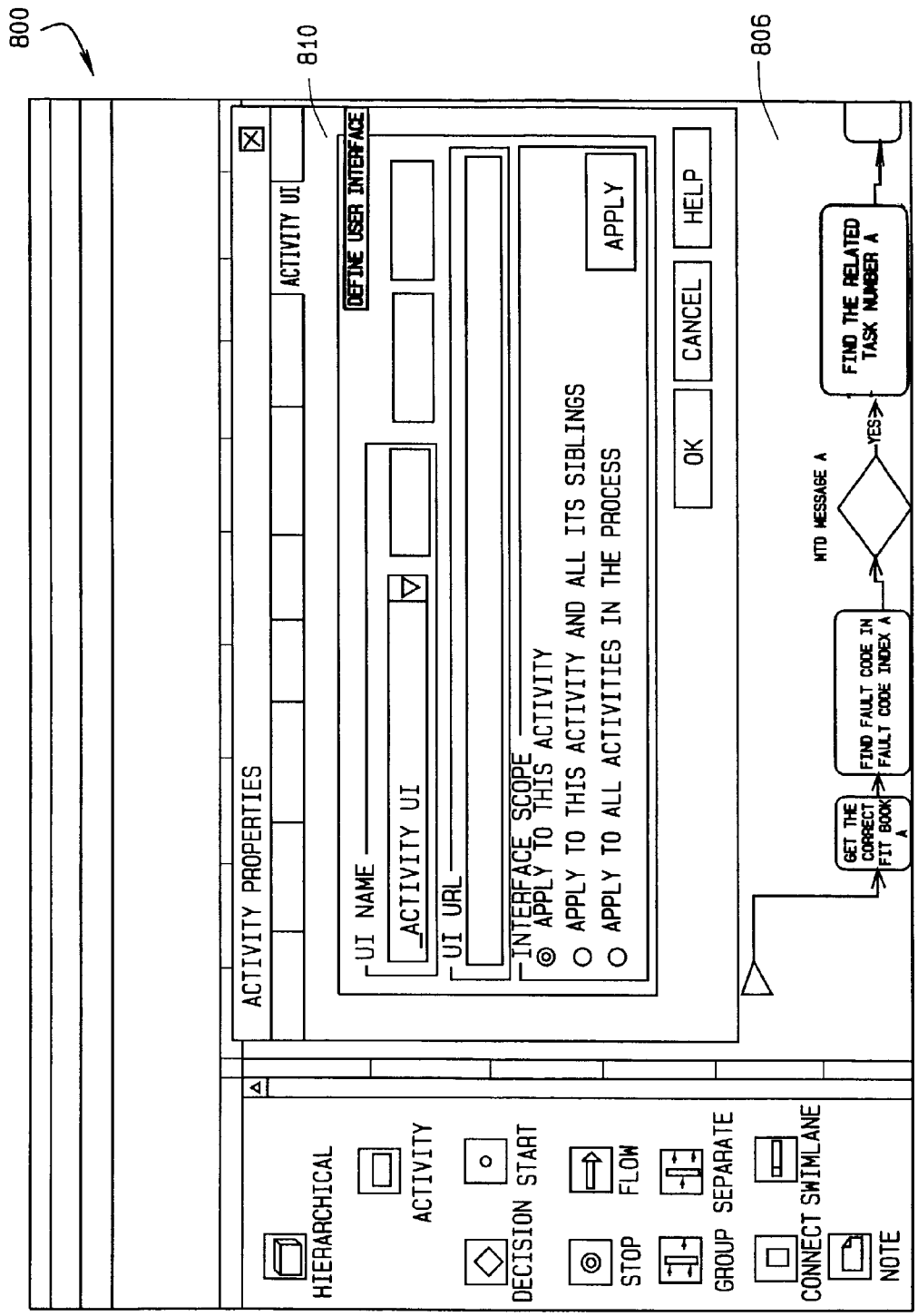
FIG. 9 is an illustration of an activity diagram and associated user interface window.

The system also provides a work-supported user interface (UI) design capability as shown in FIG. 9. An exemplary frame 800 displays an activity diagram 806 and a user interface window 810 associated with the activity described in the diagram 806. A process designer can use the window 810 to design and/or view a user interface and can associate the user interface with one or more activities described in the system 20. The designer can specify an editing tool (not shown) to be used by the system 20 for creating the user interface. A user interface thus can be designed and associated with one or more activities, for example, to support a work process in ways preferred by users of the interface and/or performers of the process.

The system 20 provides an easy-to-use yet comprehensive UML-based business process modeling environment. The system incorporates a plurality of commercial off-the-shelf software (COTS) tools by utilizing open architectures of such components. The repository 24 provides opportunity for closed-loop analysis through integrating business processes into the repository for enterprise-wide accessibility of simulation and process execution. Additionally, the system 20 is workflow-neutral and can be integrated with any workflow management system. Usefulness of the system 20 can be broadened, and new modeling languages can be developed, through the addition of modeling objects and incorporation of additional COTS tools into the system 20.

Additional embodiments of the present invention are contemplated in view of the foregoing description of the system 20. One such embodiment includes a computer-readable medium on which have been recorded instructions configured to instruct a processor having a memory. The processor is instructed to generate a process model based on a modeling language extended by at least one modeling object, and to implement the model based on at least one of simulation, project management analysis, workflow analysis and computer-aided software engineering.

The system 20 allows a user to capture cross-organizational processes with "zooming" functionality into each single activity and its attributes and objects. Process components can be used as previously described to facilitate creation of business process vocabularies. Thus, processes can be captured rapidly and in reusable and repeatable ways, and cross-process impacts can be studied and analyzed. There are many benefits of using process mapping in an enterprise. Static process models such as those described above provide a visual map of the enterprise by graphically depicting related activities and logic. Process mapping encourages streamlining of processes by identifying redundancies for possible elimination. Process mapping also is useful for benchmarking, for explaining how the enterprise operates, and for training employees.

Simulation also provides many benefits to an enterprise. Simulation analysis is an excellent decision support tool that can be used to asses best business practices. Simulation facilitates change by enabling a modeler to measure the impact of change prior to implementation. Because quantitative information is made available, simulation can facilitate more objective decision making.

The use of UML allows models to be used for software development and system design. The web functionality of the system 20 is supportive of cooperative modeling and cooperative use of models across organizational boundaries.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of providing closed-loop analysis of a business process, the method performed by a computer-based process management subsystem of an enterprise system, the method comprising:

in response to user input, selectively communicating with each of a plurality of commercial off-the-shelf software (COTS) products including at least one COTS flowcharting tool, at least one COTS simulator, at least one COTS project management tool, and at least one COTS workflow management tool, the selective communicating performable via application programming interfaces (APIs) implemented between the process management subsystem and each COTS product;

making a plurality of modeling stencils available on a graphical display via one of the at least one COTS flowcharting tool, at least some of the stencils representing modeling diagram objects selectable by a user of the display to compose and display one or more extended modeling diagrams, including one or more activity diagrams, representing the business process, the modeling diagrams extended so as to be independent of proprietary tools and protocols of the plurality of COTS products;

in response to user input via one or more simulation stencils made available on the display via one of the at least one COTS flowcharting tool, using one or more simulation objects represented by simulation stencils selected by a user of the display to extend a user-selected one of the one or more activity diagrams to obtain a simulation model that is independent of proprietary tools and protocols of the COTS products, and delivering the simulation model via one of the APIs to one of the at least one COTS simulator for performance of simulation;

in response to user input via one of the at least one COTS flowcharting tool, generating activity duration data based on simulation output received from the at least one COTS simulator, and sending the duration data to one of the at least one COTS project management tool; and in response to user input, providing abstractions of workflow and project management for use in one or more user-selected implementations of the selected activity diagram via the at least one COTS workflow management tool and via the at least one COTS project management tool.

2. The method of claim 1, further comprising:

one of the at least one process management subsystem generating a workflow model; and the at least one project management tool and the at least one workflow management tool using the workflow model.

3. The method of claim 1, further comprising providing for user selection of performance of workflow analysis and project management analysis without implementing code within the at least one workflow management tool or within the at least one project management tool.

4. The method of claim 1, further comprising providing semantic integration of the models via open architecture of the products.

5. The method of claim 1, wherein the selected activity diagram is implemented in the at least one workflow management tool and/or the at least one project management tool independent of proprietary tools and Protocols of the COTS products.

6. The method of claim 1, wherein the COTS products include at least one cluster analysis tool, the method further comprising:

in response to user input, generating data for use by the cluster analysis tool to analyze at least the selected activity diagram; and based at least in part on the analysis, receiving one or more use case models based on class definitions identified by the cluster analysis tool.

7. A computer-readable medium for use with a processor having a memory, said computer-readable medium comprising:

instructions to cause the processor, in response to user input, to cause a process management subsystem of an enterprise system to selectively communicate with each of a plurality of commercial off-the- shelf software (COTS) products including at least one COTS flowcharting tool, at least one COTS simulator, at least one COTS project management tool, and at least one COTS workflow management tool, the selective communicating performable via application programming interfaces (APIs) between the process management subsystem and each COTS product;

instructions to cause said processor to provide a plurality of modeling stencils via one of the at least one COTS flowcharting tool on a graphical display, at least some of the stencils representing modeling diagram objects selectable by a user of the display to compose and display one or more extended modeling diagrams, including one or more activity diagrams, to represent a business process, the modeling diagrams extended so as to be independent of proprietary tools and protocols of the plurality of COTS products;

instructions to cause the processor to receive selections by a user from the stencils and to display the business process as at least one or more activity diagrams composed by the user using the stencils;

instructions to cause said processor to, in response to user input via one or more simulation stencils provided on the graphical display via the flowcharting tool, use a plurality of simulation objects represented by simulation stencils selected by a user of the display to extend a user-selected one of the one or more activity diagrams to obtain a simulation model that is independent of proprietary tools and protocols of the COTS products, and deliver the simulation model to one of the at least one COTS simulator tool for performance of simulation;

instructions to cause said processor to, in response to user input via one of the at least one COTS flowcharting tool, use the activity diagram model to generate a workflow model for use by one of the at least one COTS workflow management tool and one of the at least one COTS project management tool; and instructions to cause said processor to semantically integrate workflow management and project management by the COTS tools.

8. The computer-readable medium of claim 7, further comprising instructions to cause said processor to, in response to user input via the stencils, modify the extended modeling diagrams.

9. The computer-readable medium of claim 7, further comprising instructions to cause said processor to extend an information model associated with the workflow management tool to semantically integrate the workflow management tool with the project management tool without implementing code within the workflow management tool or project management tool.

10. The computer-readable medium of claim 7, further comprising instructions to cause said processor to include the one or more activity diagrams in an extended class diagram composed by a user of the display using the modeling stencils.

11. A computer-performed method of providing closed-loop analysis of a business process, the method performed by a process management subsystem of an enterprise system using a plurality of commercial off-the-shelf software (COTS) products including at least one flowcharting tool, at least one simulator, at least one project management tool, and at least one workflow management tool, the method comprising:

in response to user input, selectively communicating with each of the COTS products via application programming interface (API) between each COTS product and the process management subsystem;

providing a plurality of modeling stencils on a graphical display via the at least one flowcharting tool, the stencils selectable by the user to compose and display extended modeling diagrams describing requirements for and activities of the business process, and to extend at least one activity diagram of the modeling diagrams to obtain a simulation model for delivery to the at least one simulator to simulate at least part of the business process, the modeling diagrams extended so as to be independent of proprietary tools and protocols of the plurality of COTS products;

based on user input, using at least one activity diagram selected by the user to specify a workflow model of the business process, generating activity duration data based on simulation output received from the at least one COSTS simulator, sending the duration data to one of the at least one COSTS project management tool, and specify a project management model of the business process using open architectures of the products to provide for semantic integration of models specified by the user; and providing abstractions of workflow and project management for use in one or more user-selected implementations of the selected activity diagram via the at least one COSTS workflow management tool and via the at least one COSTS project management tool.

12. The method of claim 11, further comprising semantically integrating two or more models specified by the user, the integrating performed by extending an information model associated with one of the products.

13. The method of claim 11, further comprising defining the business process based on a use case input by the user via the at least one flowcharting tool.

14. The method of claim 11, wherein the COTS products include a cluster analysis tool and a computer-aided software engineering (CASE) tool, the method further comprising providing a tool interface between the cluster analysis tool and the CASE tool; and providing for exchange of use case models and class diagrams via the tool interface.

15. The method of claim 11, further comprising providing mapping between semantics of the at least one workflow tool and the at least one project management tool to provide for semantic integration of a workflow model and a project management model.

16. The method of claim 15, wherein the mapping semantically integrates the project management model and a template for the workflow model.

17. A computer network including a plurality of computers for implementing a system for modeling business processes, the computer network comprising:
   a process management subsystem connected via application programming interfaces (APIs) with each of a plurality of commercial off-the-shelf software (COTS) products including at least one COTS flowcharting tool, at least one COTS simulator, at least one COTS project management tool, and at least one COTS workflow management tool; and
   a portal to the process management subsystem accessible by a user via a graphical display, the process management subsystem configured to receive one or more user selections via the at least one COTS flowcharting tool and via the display of one or more modeling stencils representing modeling objects for composing and displaying one or more extended modeling diagrams, the diagrams extended so as to be independent of proprietary tools and protocols of the plurality of COTS products;
   the process management subsystem configured to:
   receive from a user of the display, via the at least one COTS flowcharting tool, a selection of one or more simulation stencils representing objects for extending a user-selected activity diagram to obtain a simulation model for delivery to the at least one COTS simulator;
   in response to user input via one of the at least one COTS flowcharting tool. generate activity duration data based on simulation output received from the at least one COTS simulator, and send the duration data to one of the at least one COTS project management tool; and
   provide a COTS-product-neutral representation of a semantically integrated model of workflow and project management for a business process.

18. The computer network of claim 17, the system further configured to semantically integrate the COTS tools without implementing code within the tools.

19. The computer network of claim 17, wherein the tools include one or more cluster analysis tools.

20. The computer network of claim 19, wherein the tools further include a COTS computer-aided software engineering (CASE) tool.

* * * * *